(12) United States Patent
Oda et al.

(10) Patent No.: US 12,553,793 B2
(45) Date of Patent: Feb. 17, 2026

(54) EQUIPMENT AND METHOD FOR MEASURING LOSS AND CROSSTALK THAT OCCUR IN OPTICAL FIBER TRANSMISSION LINE

(71) Applicant: NTT, Inc., Tokyo (JP)

(72) Inventors: Tomokazu Oda, Musashino (JP); Atsushi Nakamura, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 151 days.

(21) Appl. No.: 18/689,806

(22) PCT Filed: Sep. 29, 2021

(86) PCT No.: PCT/JP2021/035787
§ 371 (c)(1),
(2) Date: Mar. 6, 2024

(87) PCT Pub. No.: WO2023/053250
PCT Pub. Date: Apr. 6, 2023

(65) Prior Publication Data
US 2024/0377282 A1    Nov. 14, 2024

(51) Int. Cl.
*G01M 11/00* (2006.01)
*G01M 11/02* (2006.01)

(52) U.S. Cl.
CPC .......... *G01M 11/331* (2013.01); *G01M 11/02* (2013.01); *G01M 11/335* (2013.01)

(58) Field of Classification Search
CPC ... G01M 11/331; G01M 11/02; G01M 11/335

USPC ................................................. 356/477, 491
See application file for complete search history.

(56) References Cited

U.S. PATENT DOCUMENTS

| | | | |
|---|---|---|---|
| 10,724,922 B1 * | 7/2020 | Yao ........................ | G02B 6/024 |
| 11,796,419 B2 * | 10/2023 | Redding ............. | H01S 3/08036 |
| 2006/0018586 A1 * | 1/2006 | Kishida ............. | G01D 5/35383 |
| | | | 374/E11.015 |

(Continued)

OTHER PUBLICATIONS

T. Oda et al., "Measurement Of Modal Attenuation and Crosstalk In Spliced Few-Mode Fibres Based On Mode-Resolved BOTDA", Proc. ECOC2019, P36 (2019).

*Primary Examiner* — Isiaka O Akanbi
(74) *Attorney, Agent, or Firm* — Harness, Dickey & Pierce, P.L.C.

(57) ABSTRACT

The present disclosure includes a light injecting unit that injects a frequency-swept probe light into one end of an optical fiber targeted for measurement, injects a pump light into the other end of the optical fiber targeted for measurement, with respect to the probe light, and thereby amplifies the probe light in the optical fiber targeted for measurement, a light receiving unit that receives a multiplexed light obtained by multiplexing a local light with the probe light, an interference waveform measurement unit that measures an interference waveform between the probe light and the local light, a fundamental mode time waveform analysis unit that acquires a fundamental mode time waveform of the probe light, based on the interference waveform, and a control calculation unit that calculates losses and crosstalk at loss and crosstalk occurrence points of the optical fiber targeted for measurement, based on the fundamental mode time waveform.

6 Claims, 7 Drawing Sheets

(56) References Cited

U.S. PATENT DOCUMENTS

| | | | |
|---|---|---|---|
| 2016/0097634 A1* | 4/2016 | Yao | G01B 11/168 |
| | | | 356/34 |
| 2016/0258743 A1* | 9/2016 | Yao | G01L 1/242 |
| 2020/0408636 A1* | 12/2020 | Takahashi | G01M 11/319 |
| 2021/0310897 A1* | 10/2021 | Oda | G01M 11/39 |
| 2021/0381925 A1* | 12/2021 | Takahashi | G01M 11/3145 |
| 2021/0396626 A1* | 12/2021 | Okamoto | G01D 5/35361 |
| 2022/0260454 A1* | 8/2022 | Oda | G01M 11/39 |
| 2022/0381645 A1* | 12/2022 | Nakamura | G01M 11/39 |

* cited by examiner

EQUIPMENT AND METHOD FOR MEASURING LOSS AND CROSSTALK THAT OCCUR IN OPTICAL FIBER TRANSMISSION LINE

CROSS-REFERENCE TO RELATED APPLICATIONS

This application is a 371 U.S. National Phase of International Application No. PCT/JP2021/035787, filed on Sep. 29, 2021. The entire disclosure of the above application is incorporated herein by reference.

TECHNICAL FIELD

The present disclosure relates to a measurement apparatus and a measurement method thereof for independently measuring a loss and crosstalk occurring in an optical fiber transmission line.

BACKGROUND ART

In recent years, with rapid increase in transmission traffic, a few-mode fiber (FMF) and a multi-mode fiber (MMF), with which a plurality of propagation modes can be used, have been attracting a lot of attention as items that can realize a further increase in capacity, replacing a single-mode fiber (SMF) used in current transmission lines. In such fibers, differential mode attenuation (DMA) caused by different losses depending on modes, and crosstalk (which may be referred to as XT hereinafter), in which some modes are coupled to different modes, may occur when light passes through a connection point or a device such as a mode multiplexer/demultiplexer. Since DMA and XT are important parameters for signal processing on a receiving side, it is desirable to be able to measure a loss and XT of each mode in a transmission line at each point in order to evaluate the quality of the transmission line.

So far, a method for acquiring propagation characteristics for each mode that uses a Brillouin gain analysis method has been proposed (refer to NPL 1, for example). In this measurement method, a loss and XT suffered by a pump light can be acquired from a generated gain amount by controlling a frequency difference between the pump light and a probe light injected into an optical fiber. However, when there are a plurality of loss and XT occurrence points, an XT component of the probe light is generated in the fiber, and a gain caused by the XT component becomes an error factor, and thus there is a problem that it is difficult to measure losses and XT, occurring at a plurality of points, at each of the points.

CITATION LIST

Non Patent Literature

[NPL 1] T. Oda et al., "MEASUREMENT OF MODAL ATTENUATION AND CROSSTALK IN SPLICED FEW-MODE FIBRES BASED ON MODE-RESOLVED BOTDA", Proc. ECOC 2019, P36 (2019).

SUMMARY OF INVENTION

Technical Problem

An object of the present disclosure is to provide a measurement apparatus and a measurement method thereof for independently measuring losses and XT occurring at a plurality of points of an optical fiber through which propagation occurs in a plurality of modes.

Solution to Problem

A measurement apparatus of the present disclosure is an apparatus for measuring a loss and crosstalk of an optical fiber targeted for measurement, the measurement apparatus including:

- a light injecting unit configured to inject a frequency-swept probe light into one end of the optical fiber targeted for measurement, inject a pump light having a frequency difference corresponding to a Brillouin frequency shift amount, with respect to the probe light, into the other end of the optical fiber targeted for measurement, and thereby amplify the probe light in the optical fiber targeted for measurement;
- a light receiving unit configured to receive a multiplexed light obtained by multiplexing a local light, given a delay time by injection into a delay optical fiber having a length corresponding to a group delay time in propagation through an entire path of the optical fiber targeted for measurement as a fundamental mode, with the probe light output from the optical fiber targeted for measurement;
- an interference waveform measurement unit configured to measure an interference waveform between the probe light and the local light using a signal intensity obtained from the light receiving unit;
- a fundamental mode time waveform analysis unit configured to acquire a fundamental mode time waveform of a probe light that has propagated through the entire path of the optical fiber targeted for measurement as a fundamental mode, based on the interference waveform; and
- a control calculation unit configured to calculate a loss and crosstalk at a desired point of the optical fiber targeted for measurement, based on the fundamental mode time waveform.

A measurement method of the present disclosure is a method of measuring a loss and crosstalk of an optical fiber targeted for measurement, the measurement method including: injecting, by a light injecting unit, a frequency-swept probe light into one end of the optical fiber targeted for measurement and a pump light having a frequency difference corresponding to a Brillouin frequency shift amount, with respect to the probe light, into the other end of the optical fiber targeted for measurement, and thereby amplifying the probe light in the optical fiber targeted for measurement; receiving, by a light receiving unit, a multiplexed light obtained by multiplexing a local light, given a delay time by injection into a delay optical fiber having a length corresponding to a group delay time in propagation through an entire path of the optical fiber targeted for measurement as a fundamental mode, with the probe light output from the optical fiber targeted for measurement;

measuring, by an interference waveform measurement unit, an interference waveform between the probe light and the local light using a signal intensity obtained from the light receiving unit;

acquiring, by a fundamental mode time waveform analysis unit, a fundamental mode time waveform of a probe light that has propagated through the entire path of the optical fiber targeted for measurement as a fundamental mode, based on the interference waveform; and calculating, by a control calculation unit, a loss and crosstalk at a desired point of the optical fiber targeted for measurement, based on the fundamental mode time waveform.

Advantageous Effects of Invention

According to the present disclosure, it is practical to independently measure a loss and XT occurring at each point of an optical fiber, through which propagation occurs in a plurality of modes, by curbing an XT component of a probe light in an optical fiber, which is a problem in measurement of a loss and XT in accordance with the Brillouin gain analysis method.

DESCRIPTION OF EMBODIMENTS

Figure 1:
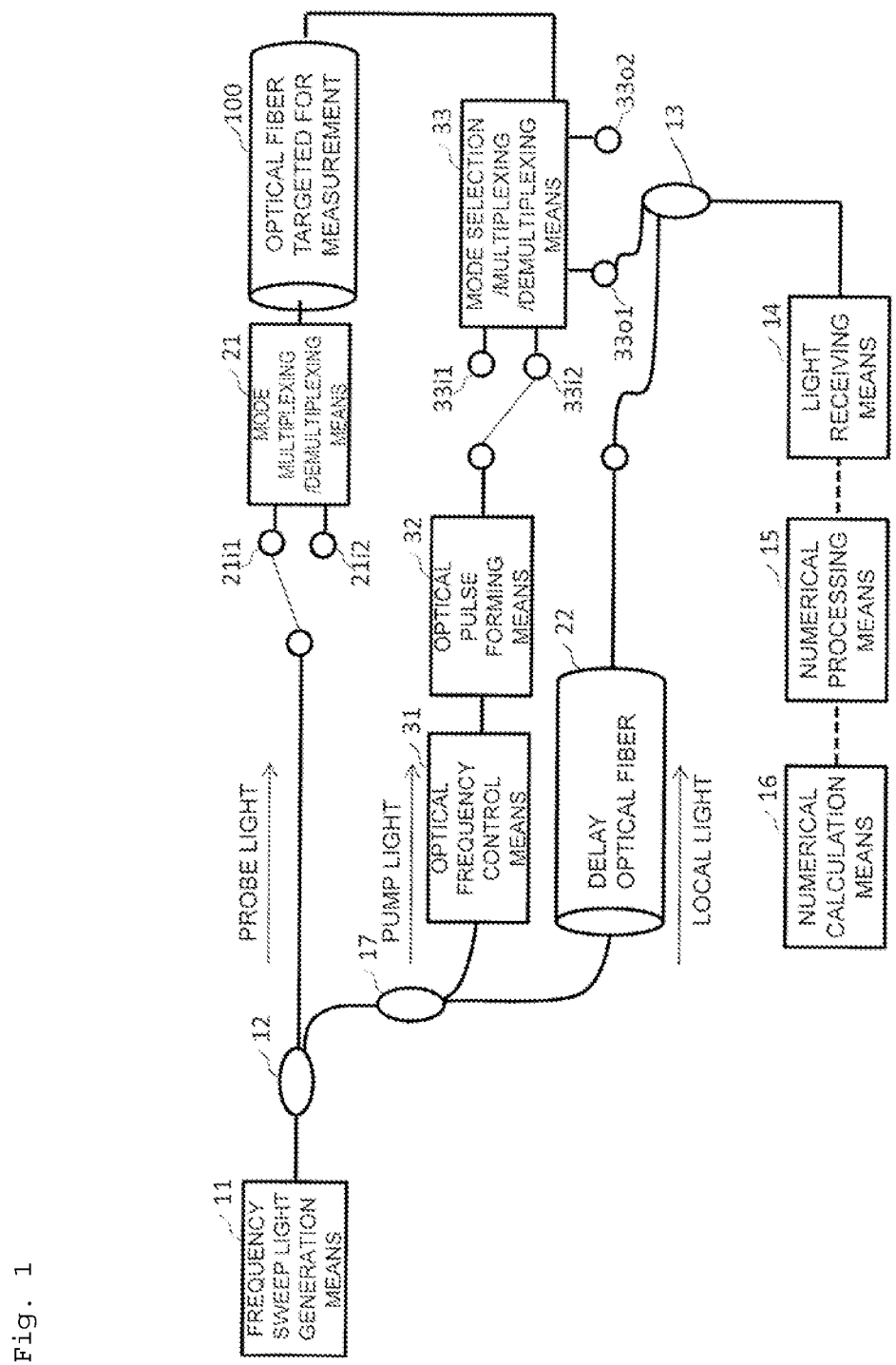
FIG. 1 illustrates an example of a measurement means according to an embodiment of the present disclosure.

Embodiments of the present disclosure will be described hereinafter in detail with reference to the drawings. It is to be understood that the present disclosure is not limited to the embodiments described below. The embodiments are merely exemplary and the present disclosure can be implemented in various modified and improved modes based on knowledge of those skilled in the art. Constituent elements with the same reference signs in the present specification and in the drawings represent the same constituent elements.

(Brillouin Gain Generated Between Plurality of Modes)

In an optical fiber targeted for measurement, a Brillouin frequency shift $v_b$ at which Brillouin amplification is maximized is given as follows.

[Math. 1]
$$v_b = 2n_i V_a / \lambda \quad (1)$$

where $n_i$ denotes an effective refractive index of the mode, $V_a$ denotes an effective velocity of acoustic waves, and $\lambda$ denotes a wavelength in vacuum. That is, an optical fiber through which propagation occurs in a plurality of modes means that a Brillouin frequency shift amount differs depending on a propagating mode, and a Brillouin gain spectrum in each mode is different for each mode. The present disclosure utilizes this.

When a two-mode fiber (TMF), through which propagation occurs in only two modes, is considered for simplicity, a pump light and a probe light each having amplitude in both $LP_{01}$ and $LP_{11}$ modes present the following three different Brillouin gain spectra.

(1) $v_{01-01}$ (interaction between an $LP_{01}$ component of the pump light and an $LP_{01}$ component of the probe light)

(2) $v_{01-11}$ (interaction between the $LP_{01}$ component of the pump light and an $LP_{11}$ component of the probe light or between an $LP_{11}$ component of the pump light and the $LP_{01}$ component of the probe light)

(3) $v_{11-11}$ (interaction between the $LP_{11}$ component of the pump light and the $LP_{11}$ component of the probe light)

In this way, the pump light and the probe light after emission of the TMF are in states in which the $LP_{01}$ mode and the $LP_{11}$ mode can exist respectively. In the present disclosure, the probe light is limited to a component that has propagated only in the $LP_{01}$ mode, and only the component of the probe light in the $LP_{01}$ mode is extracted in an FMCW method. Accordingly, the $LP_{01}$ mode is always present in a probe light and the $LP_{01}$ mode or the $LP_{11}$ mode is present in a pump light in an optical fiber targeted for measurement, and thus it is practical to measure a Brillouin amplification amount occurring at this time and analyze the amplification amount to acquire losses and crosstalk (loss in the $LP_{01}$ mode, loss in the $LP_{11}$ mode, and crosstalk) to which the pump light has been subjected. This will be described in detail below.

The apparatus of the present disclosure includes a light injecting unit, a light delaying unit, and a light receiving unit.

The light injecting unit converts a probe light and a pump light into a specific mode and then injects them into an optical fiber targeted for measurement. The probe light is a frequency-swept continuous light. The pump light has an arbitrary frequency difference with respect to the probe light.

The light delaying unit adds a delay time to a local light that is the same frequency-swept light as the probe light, by injecting the local light into a delay optical fiber. The delay optical fiber allows propagation only in a fundamental mode and has a length corresponding to a group delay time in propagation through the entire path of the optical fiber targeted for measurement as the fundamental mode.

The light receiving unit receives multiplexed light of the probe light that has propagated through the optical fiber targeted for measurement and the local light.

The apparatus of the present disclosure includes an interference waveform measurement unit, a fundamental mode time waveform analysis unit, and a control calculation unit. The interference waveform measurement unit measures an interference waveform of the probe light that has propagated through the optical fiber targeted for measurement and the local light that has propagated through the delay optical fiber.

The fundamental mode time waveform analysis unit acquires a time waveform of the probe light that has propagated through the entire path of the optical fiber targeted for measurement as the fundamental mode on the basis of the interference waveform.

The control calculation unit controls the light injecting unit, and calculates a loss and XT at an arbitrary point of the optical fiber targeted for measurement on the basis of the probe light time waveform acquired by the fundamental mode time waveform analysis unit.

The control calculation unit executes the following processing in order to acquire the Brillouin gain coefficient of the optical fiber targeted for measurement.

The control calculation unit instructs the light injecting unit to inject a pump light and a probe light having an arbitrary frequency difference into a reference optical fiber having the same number of modes as that of the optical fiber targeted for measurement and having no mode coupling, by combining the pump light in all modes and the probe light in one arbitrary mode.

The control calculation unit acquires a Brillouin gain coefficient generated by the probe light for each combination of the modes, from a signal intensity measured by the light receiving unit.

The control calculation unit instructs the light injecting unit to change the arbitrary frequency difference, and acquires the Brillouin gain coefficient with the arbitrary frequency difference changed, from the signal intensity measured by the light receiving unit.

The control calculation unit executes the following processing in order to measure a loss and XT in the optical fiber targeted for measurement.

The control calculation unit prepares a pump light and a probe light having a frequency difference at which a Brillouin gain coefficient has been generated, for the light injecting unit, and injects a pump light in one arbitrary mode and a probe light, in a mode where the Brillouin gain coefficient has been acquired, into the optical fiber targeted for measurement.

The control calculation unit acquires Brillouin amplification components generated by the probe light for each frequency difference as a distribution in the longitudinal direction of the optical fiber targeted for measurement, from the fundamental mode time waveform acquired by the fundamental mode time waveform analysis unit.

The control calculation unit acquires a ratio of an amplification amount according to Brillouin amplification at each loss and XT occurrence point from the distribution of the Brillouin amplification components in the longitudinal direction.

The control calculation unit calculates a loss and XT at a first loss and XT occurrence point from a point corresponding to an end part of the optical fiber targeted for measurement into which the pump light has been injected, using the ratio of the amplification amount according to Brillouin amplification and the Brillouin gain coefficients.

A loss and XT at a desired point are calculated using a ratio of an amplification amount according to Brillouin amplification at each loss and XT occurrence point, the Brillouin gain coefficients, and losses and XT before the desired point.

Example of Apparatus Configuration

FIG. 1 illustrates an example of a measurement means according to an embodiment of the present disclosure. An apparatus of the present embodiment includes a frequency sweep light generation means 11, an optical frequency control means 31, an optical pulse forming means 32, a delay optical fiber 22, a multiplexing element 13, a light receiving means 14, a numerical processing means 15, and a numerical calculation means 16. The numerical calculation means 16 of the present disclosure can also be realized by a computer and a program, and the program can be recorded in a recording medium or can also be provided via a network.

The frequency sweep light generation means 11, the optical frequency control means 31, and the optical pulse forming means 32 serve as a light injecting unit of the present disclosure. The delay optical fiber 22 serves as a light delaying unit of the present disclosure. The light receiving means 14 serves as a light receiving unit of the present disclosure. The numerical processing means 15 and the numerical calculation means 16 serve as an interference waveform measurement unit, a fundamental mode time waveform analysis unit, and a control calculation unit of the present disclosure.

Further, the apparatus of the present embodiment further includes a mode multiplexing/demultiplexing means 21 and a mode selection/multiplexing/demultiplexing means 33. The mode multiplexing/demultiplexing means 21 selects a mode of a probe light to be injected into an optical fiber 100 targeted for measurement. The mode selection/multiplexing/demultiplexing means 33 selects the mode of a pump light to be injected into the optical fiber 100 targeted for measurement.

For example, the probe light input to the input 21$i$1 of the mode multiplexing/demultiplexing means 21 is injected into the optical fiber 100, targeted for measurement, in the unconverted $LP_{01}$ mode. On the other hand, a probe light input to an input 21$i$2 of the mode multiplexing/demultiplexing means 21 is converted into the $LP_{11}$ mode and then is injected into the optical fiber 100 targeted for measurement.

For example, a probe light input to an input 33$i$1 of the mode multiplexing/demultiplexing means 33 is injected into the optical fiber 100, targeted for measurement, in the unconverted $LP_{01}$ mode. On the other hand, a probe light input to an input 33$i$2 of the mode multiplexing/demultiplexing means 33 is converted into the $LP_{11}$ mode and then is injected into the optical fiber 100 targeted for measurement.

In FIG. 1, light output from the frequency sweep light generation means 11 that generates coherent frequency sweep light is branched into three by a branching element 12, which are a probe light, a pump light, and a local light. The probe light is injected into the optical fiber 100 targeted for measurement as a fundamental mode by the mode multiplexing/demultiplexing means 21 in FIG. 1.

The pump light is pulsed by an optical pulse forming means 32 after a frequency difference corresponding to a Brillouin frequency shift of the optical fiber 100 targeted for measurement is given to a high frequency side by an optical frequency control means 31. Thereafter, the pump light is converted into an arbitrary mode by the mode selection/multiplexing/demultiplexing means 33 and then is injected into on the optical fiber 100 targeted for measurement, on a probe light emission side.

The pulsed pump light and the probe light injected into the optical fiber 100 targeted for measurement cause a Brillouin interaction to occur in the entire path of the optical fiber 100 targeted for measurement, and thus the probe light is Brillouin-amplified. Here, since the pump light is a pulse, an amplification amount of the probe light at each time based on the injection time of the pump light corresponds to the light intensity of the pump light at each point of the optical fiber 100 targeted for measurement.

The local light is given a delay amount corresponding to the optical fiber 100 targeted for measurement by the delay optical fiber 22. Thereafter, the local light and the probe light emitted from the optical fiber 100 targeted for measurement are multiplexed by the multiplexing element 13 and converted into an electrical signal by the light receiving means 14. The light receiving means 14 is an arbitrary device capable of converting an optical signal into an electrical signal, and can use a balance photodetector (BPD), for example. The received electrical signal is converted into a numerical form by the numerical processing means 15, and the time waveform of a probe light component that has propagated through the entire path of the optical fiber targeted for measurement as a fundamental mode is extracted by the numerical calculation means 16. Thereafter, the numerical calculation means 16 acquires a Brillouin gain distribution, from the time waveform of the probe light component.

According to specific Brillouin gain analysis, a reference intensity of the probe light on condition that a pump light is not input is acquired. Thereafter, a signal intensity on condition that the pump light and the probe light are injected is acquired. The Brillouin gain distribution can be acquired by calculating an increase amount of the reference intensity from the signal intensity.

This configuration is an example, and as long as an apparatus configuration in which a frequency difference and an injection time difference, corresponding to a frequency (wavelength) shift depending on a mode, are given between the pump light and the probe light, and a time waveform in amplifying the probe light that has propagated in the entire path of the optical fiber 100 targeted for measurement as the fundamental mode in an arbitrary mode can be extracted in a similar manner is provided, any means may be employed. Further, since the present disclosure can be applied to general SMF by reducing an injection wavelength, the optical fiber 100 targeted for measurement only needs to have conditions for propagation in a plurality of modes.

(Acquisition of Brillouin Gain Coefficient)

Since a Brillouin gain spectrum generally has a full width at half maximum (FWHM) of about 30 MHZ, a Brillouin action occurs at the same time for other mode components with the Brillouin frequency shift $v_b$ for each mode insufficiently separated. That is, since a gain is generated by a mode other than a desired mode at the time of observing a gain, a gain in which a loss component and an XT component are mixed is generated. A Brillouin gain coefficient between each mode is utilized to resolve a gain component into a loss component and an XT component. Resolution into a loss component and an XT component using the Brillouin will be described, with reference to a connection point model in which losses and XT occur at a plurality of connection points, later. A procedure for acquiring the Brillouin gain coefficient between modes will be described below.

In an optical fiber in which a plurality of modes propagate, a Brillouin frequency shift and a gain amount are different depending on a combination of modes used. By utilizing such a difference, a reference optical fiber having the same characteristics as that of the optical fiber 100 targeted for measurement and having no mode coupling in the optical fiber is separately prepared in advance, and a Brillouin gain coefficient of each mode corresponding to a frequency difference between a pump light and a probe light in the optical fiber is acquired. Here, the reference optical fiber is an optical fiber having the same number of modes as that of the optical fiber 100 targeted for measurement, and an optical fiber having the same Brillouin gain spectrum (a frequency difference between a pump light and a probe light where gains are generated and a Brillouin gain coefficient at the frequency difference) generated between modes, but having no mode coupling. That is, the reference optical fiber is used to acquire the Brillouin gain coefficient in advance in a state in which there is no mode coupling.

The Brillouin gain coefficient is acquired by a combining a pump light in all modes through the optical fiber 100 targeted for measurement and a probe light in one arbitrary mode. That is, in an optical fiber with only two propagation modes (TMF), when the $LP_{01}$ mode is used for the mode of a probe light, combinations for acquiring a Brillouin gain coefficient are as follows.

(1) $v_{01\text{-}01}$ (interaction between the $LP_{01}$ component of a pump light and the $LP_{01}$ component of the probe light)

(2) $v_{01\text{-}11}$ (interaction between the $LP_{11}$ component of the pump light and the $LP_{01}$ component of the probe light)

Figure 2:
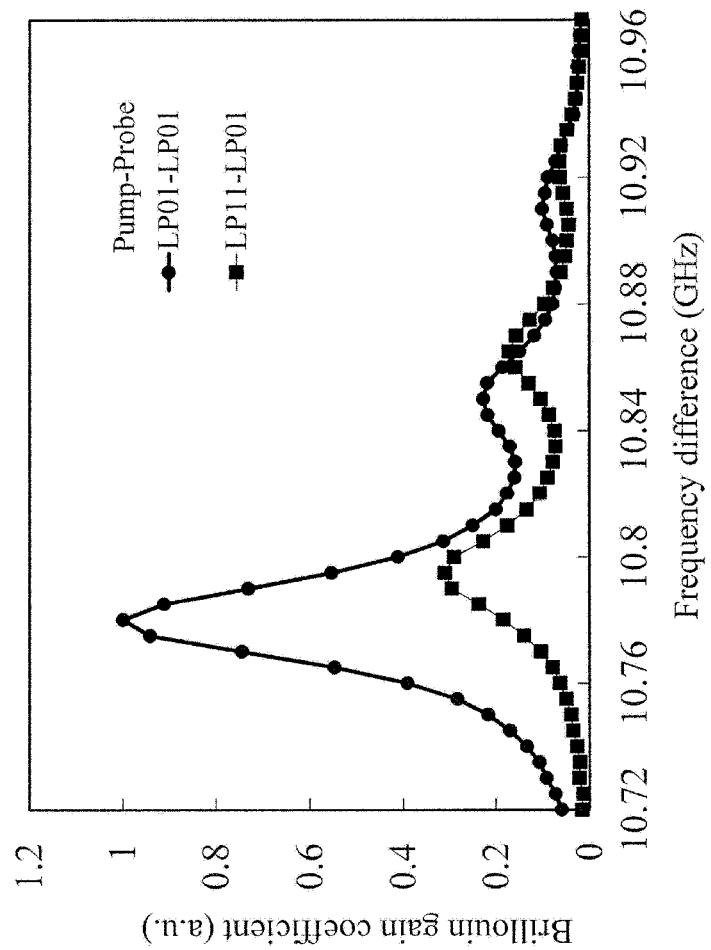
FIG. 2 illustrates examples of Brillouin gain spectra in a two-mode fiber.

FIG. 2 illustrates examples of Brillouin gain spectra in a two-mode fiber. It can be confirmed from FIG. 2 that Brillouin gain coefficients of the modes generated by a frequency difference between a pump light and a probe light are different.

Note that the Brillouin gain coefficient can be acquired by fixing the power of modes of a pump light and a probe light, changing the mode of an injected pump light in a state in which the mode of an injected probe light is fixed, and measuring a gain amount at that time.

(Probe Light XT Component Control by FMCW Method)

When there are a plurality of loss and XT occurrence points in a transmission line, a gain is generated due to a component (XT of a probe light) other than the mode of the probe light used for acquiring a Brillouin gain coefficient, and thus it becomes difficult to accurately measure a loss and XT. Therefore, an XT component of a probe light in an optical fiber is removed by utilizing a frequency sweep optical interference method (FMCW method) and a group delay time difference (DMD) between modes.

Figure 3:
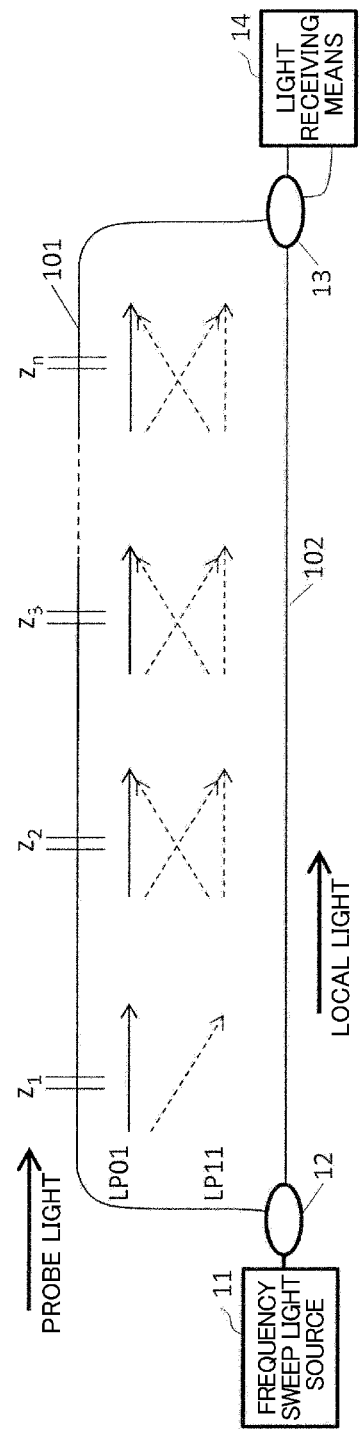
FIG. 3 is an explanatory diagram of a crosstalk component generated in a probe light that has propagated in an $LP_{01}$ mode through the entire path of an optical fiber targeted for measurement.
Figure 4:
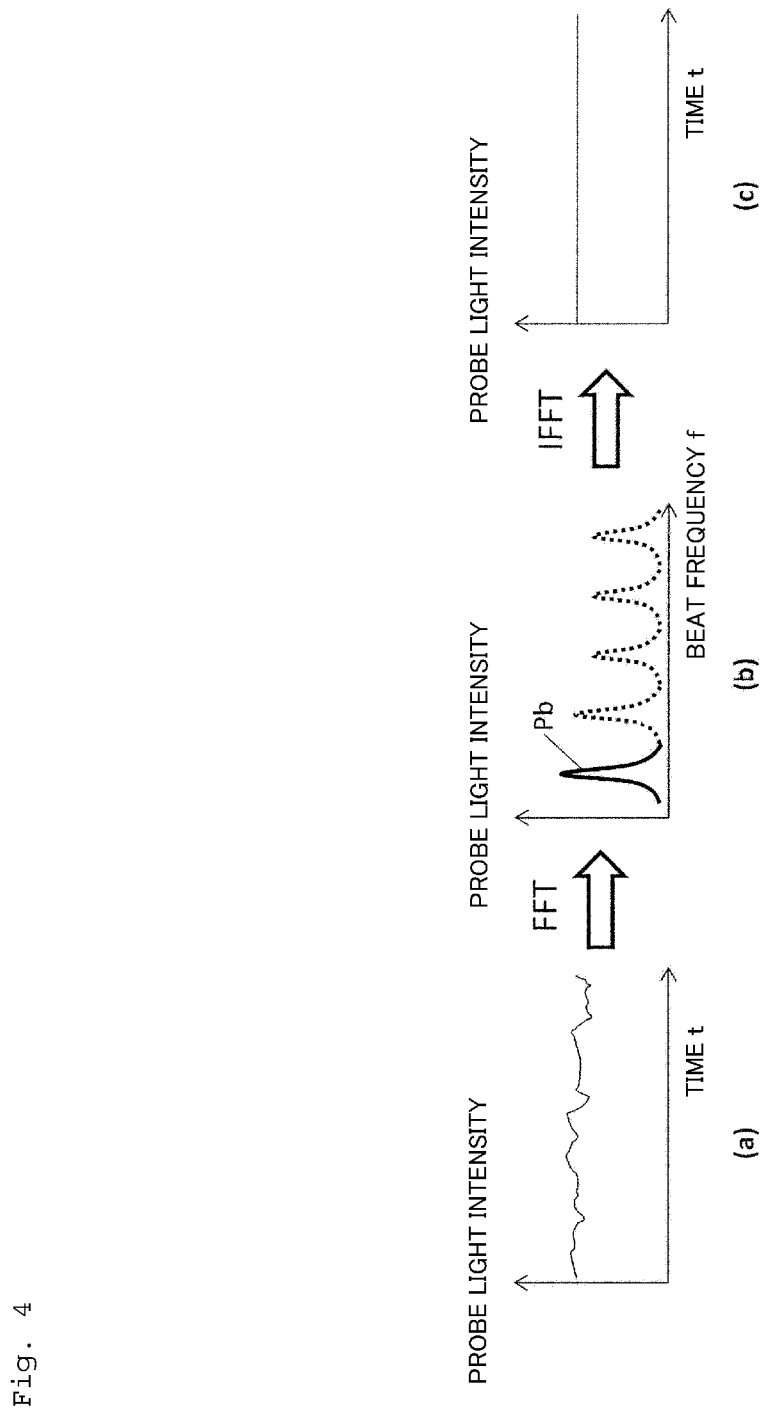
FIG. 4 is an explanatory diagram of a method of extracting a probe light that has propagated in the $LP_{01}$ mode through the entire path of an optical fiber targeted for measurement.

Specifically, when the mode of a probe light for measuring a loss and XT is $LP_{01}$ in a TMF, only a component that has propagated as $LP_{01}$ through the entire path of the optical fiber 100 targeted for measurement is extracted. FIGS. 3 and 4 are conceptual diagrams of this extraction method.

In this extraction, as shown in FIG. 3, the frequency sweep light source 11 is prepared first, and light from the frequency sweep light source 11 is branched into two by the branching element 12. One of the branched lights is set as a probe light and the other is set as a local light. The probe light is injected into a TMF 101 and the local light is injected into an SMF 102 as $LP_{01}$. Since XT is generated at connection points $z_1$ to $z_n$ in the TMF 101, a part of the probe light is propagated as $LP_{11}$. The light emitted from the TMF 101 and the SMF 102 is multiplexed by the multiplexing element 13 and then converted into an electrical signal by the light receiving means 14.

The received electrical signal is an interference waveform of the probe light and the local light as shown in FIG. 4(a), and on subjecting this waveform to Fourier transform, the intensity of the probe light with respect to a beat frequency of the probe light and the local light as shown in FIG. 4(b) can be obtained. Here, a beat frequency corresponds to a delay time difference between the probe light and the local light.

In an optical fiber through which a plurality of modes propagate, a group delay time is different in each mode. Here, assuming an optical fiber in which a group delay time of $LP_{01}$ is less than that of $LP_{11}$, a peak Pb having the smallest beat frequency as shown in FIG. 4(b) becomes a component that has propagated as $LP_{01}$ through the entire path of the optical fiber 100 targeted for measurement. That is, a peak higher than this frequency becomes a component propagating as $LP_{11}$ a part of the path of the optical fiber 100 targeted for measurement. Here, with respect to the waveform of FIG. 4(b), only the peak Pb is extracted using a frequency filter, and this peak Pb is shifted to DC, that is, a point where the frequency is zero. Thereafter, by performing inverse Fourier transform on this waveform, a time waveform of the probe light of the component that has propagated as $LP_{01}$ through the entire path of the optical fiber 100 targeted for measurement, that is, a "fundamental mode time waveform," as shown in FIG. 4(c), can be acquired.

(Loss And XT Measurement Using Brillouin Gain and Brillouin Loss)

Figure 5:
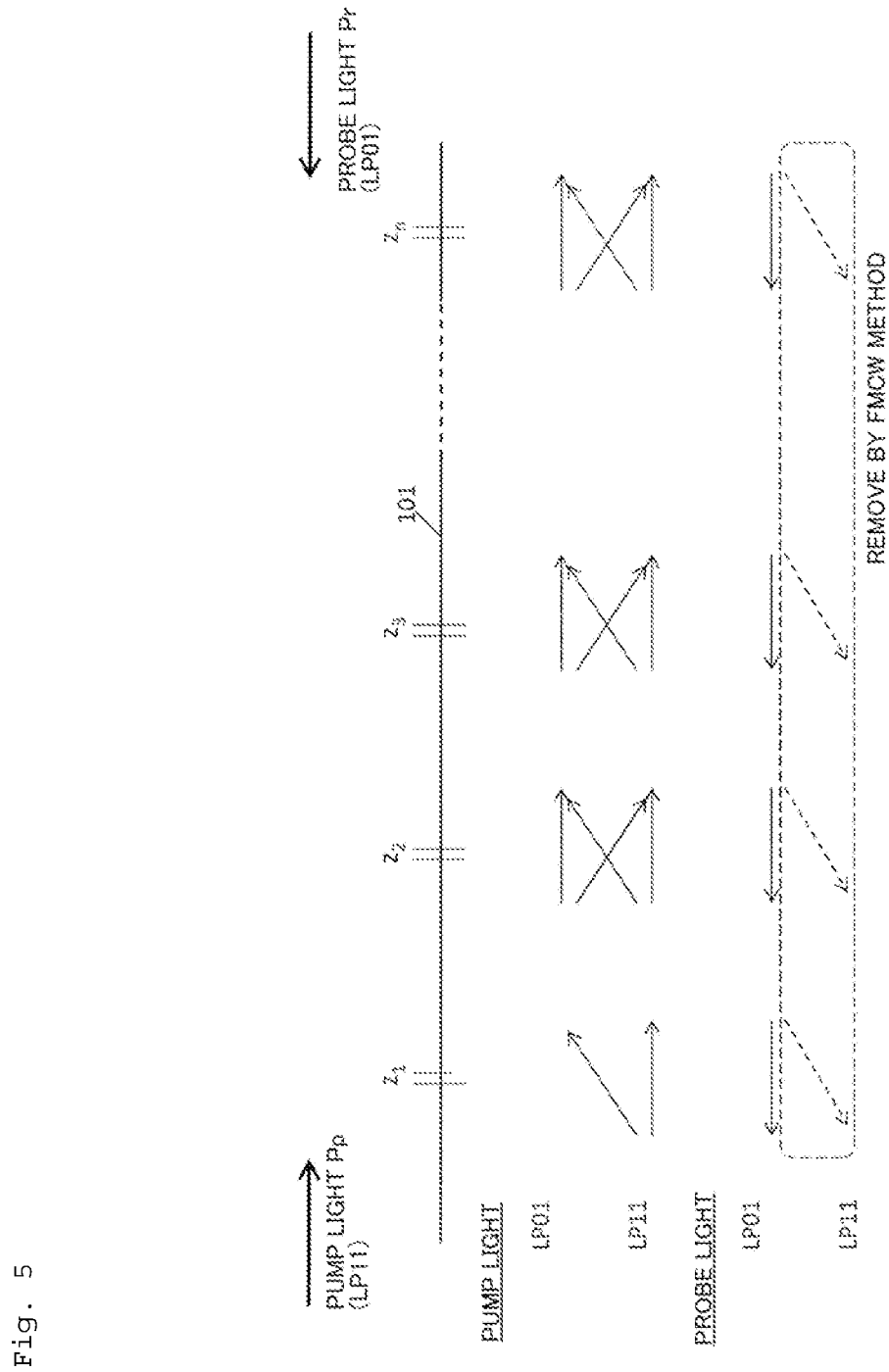
FIG. 5 illustrates an example of an optical fiber transmission line model.

For description of an embodiment according to the present disclosure, as an example, an optical fiber transmission line model in which there are n connection points (loss and XT occurrence points) as shown in FIG. 5 is conceived. In this model, the $LP_{11}$ mode is used for a pump light, the $LP_{01}$ mode is used for a probe light, and amplification amounts of Brillouin amplification generated in the probe light during collision are compared in the longitudinal direction of the optical fiber 100 targeted for measurement, thereby measuring a loss amount and an XT amount generated at each connection point.

As shown in FIG. 5, when the pump light and the probe light pass through the connection points $z_1$ to $z_n$, both a loss and XT coupled to other mode components are generated at each connection point. In the present embodiment, only a component that has propagated as the $LP_{01}$ mode through the entire path of the optical fiber 100 targeted for measurement in the probe light that has been emitted from the optical fiber 100 targeted for measurement is extracted by the FMCW method. Then, by using the extracted probe light component of the $LP_{01}$ mode, an amplification amount derive from Brillouin amplification generated by a Brillouin interaction between the probe light of the $LP_{01}$ mode and the pump light of the $LP_{11}$ mode or the $LP_{01}$ mode is acquired.

Given that the light intensities of the pump light and the probe light injected into the optical fiber 100 targeted for measurement are defined as $P_r$ and $P_p$, an amplification amount $\Delta P_{s01}$ derived from Brillouin amplification of the $LP_{01}$ probe light generated at a point z of the transmission line can be expressed as follows.

[Math. 2]

$$\Delta P_{s01}(z \mid z \leq z_1) = g_{01-11}\overline{\eta}_{01-01}^{n-2}\overline{\eta}_{01-01}^{-1}P_t P_p, \quad (2)$$

$$\Delta P_{s01}(z \mid z_1 \leq z \leq z_2) = \quad (3)$$
$$\left(g_{01-11}\overline{\eta}_{01-01}^{n-2}P_t\overline{\eta}_{11-11}^{-1}P_p + g_{01-01}\overline{\eta}_{01-01}^{n-2}P_t\overline{\eta}_{01-01}^{-1}P_p\right)\overline{\eta}_{01-01}^{-1}$$

$$\Delta P_{s01}(z \mid z_2 \leq z \leq z_3) = \{g_{01-01}(\overline{\eta}_{11-11}^2\overline{\eta}_{11-11}^1 + \overline{\eta}_{11-01}^1\overline{\eta}_{01-01}^2) + \quad (4)$$
$$g_{01-11}(\overline{\eta}_{11-11}^1\overline{\eta}_{11-11}^2 + \overline{\eta}_{11-01}^1\overline{\eta}_{01-11}^2)\}P_p\overline{\eta}_{01-01}^{n-1}P_t,$$

$$\Delta P_{s01}(z \mid z_{n-1} \leq z \leq z_n) = g_{01-01}\overline{\eta}_{11-01}^{1-n-1} + g_{01-11}\overline{\eta}_{11-11}^{1-n-1})P_p\overline{\eta}_{01-01}^{n-1}P_r, \quad (5)$$

$$\Delta P_{s01}(z \mid z_n \leq z) = \{g_{01-01}(\overline{\eta}_{11-01}^{1-n-1}\overline{\eta}_{01-01}^n + \overline{\eta}_{11-11}^{1-n-1}\overline{\eta}_{11-01}^n) + \quad (6)$$
$$g_{01-11}(\overline{\eta}_{11-11}^{1-n-1}\overline{\eta}_{11-11}^n + \overline{\eta}_{11-01}^{1-n-1}\overline{\eta}_{01-11}^n)\}P_p\overline{\eta}_{01-01}^{n-1}P_s,$$

Here, $g_{01-01}$ and $g_{01-11}$ are Brillouin gain coefficients between $LP_{01}$ and $LP_{01}$ and between $LP_{01}$ and $LP_{11}$, respectively, and $\eta^k_{ab-cd}$ is a coupling efficiency from $LP_{ab}$ to $LP_{cd}$ mode at a k-th connection point $z_k$ viewed from the pump light injection side. Here, given that k is 1 to n and n to 1, it is a coupling efficiency at the time of passing through the first to n-th and n-th to first connection points $z_1$ to $z_n$, and in regards to arrows attached to $\eta$, → indicates the coupling efficiency of the pump light and ← indicates the coupling efficiency of the probe light. Note that propagation loss to which the pump light and the probe light are subjected is disregarded for simplicity.

When amplification amounts according to Brillouin amplification in Formulas (2) to (5) are compared in the longitudinal direction, the ratio of the amplification amount of the probe light observed at each of the connection points $z_1$ to $z_n$ can be expressed as follows.

[Math. 7]

$$L_1 = \frac{\Delta P_{s01}(z \mid z_1 \leq z \leq z_2)}{\Delta P_{s01}(z \mid z \leq z_1)} = \overline{\eta}_{11-11}^1 + \frac{g_{01-01}}{g_{01-11}}\overline{\eta}_{11-01}^1 \quad (7)$$

$$L_2 = \frac{\Delta P_{s01}(z \mid z_2 \leq z \leq z_3)}{\Delta P_{s01}(z \mid z_1 \leq z \leq z_2)} \quad (8)$$
$$= \frac{g_{01-01}(\overline{\eta}_{01-01}^1\overline{\eta}_{11-01}^2 + \overline{\eta}_{11-01}^1\overline{\eta}_{01-01}^2) +}{g_{01-01}\overline{\eta}_{11-01}^1 + g_{01-11}\overline{\eta}_{11-11}^1}$$
$$\phantom{=}\frac{g_{01-11}(\overline{\eta}_{11-11}^1\overline{\eta}_{11-11}^2 + \overline{\eta}_{11-01}^1\overline{\eta}_{01-11}^2)}{g_{01-01}\overline{\eta}_{11-01}^1 + g_{01-11}\overline{\eta}_{11-11}^1}$$

[Math. 9]

$$L_3 = \frac{\Delta P_{s01}(z \mid z_3 \leq z \leq z_4)}{\Delta P_{s01}(z \mid z_2 \leq z \leq z_3)} \quad (9)$$
$$= \frac{g_{01-01}(\overline{\eta}_{11-11}^{1-2}\overline{\eta}_{11-11}^3 + \overline{\eta}_{11-01}^{1-2}\overline{\eta}_{01-01}^3) +}{g_{01-01}\overline{\eta}_{11-01}^{1-2} + g_{01-11}\overline{\eta}_{11-11}^{1-2}}$$
$$\phantom{=}\frac{g_{01-11}(\overline{\eta}_{11-11}^{1-2}\overline{\eta}_{11-11}^3 + \overline{\eta}_{11-01}^{1-2}\overline{\eta}_{01-11}^3)}{g_{01-01}\overline{\eta}_{11-01}^{1-2} + g_{01-11}\overline{\eta}_{11-11}^{1-2}}$$

$$L_n = \frac{\Delta P_{s01}(z \mid z_n \leq z)}{\Delta P_{s01}(z \mid z_{n-1} \leq z \leq z_n)}$$
$$= \frac{g_{01-01}(\overline{\eta}_{11-11}^{1-n-1}\overline{\eta}_{11-01}^n + \overline{\eta}_{11-01}^{1-n-1}\overline{\eta}_{01-01}^n) +}{g_{01-01}\overline{\eta}_{11-01}^{1-n-1} + g_{01-11}\overline{\eta}_{11-11}^{1-n-1}} \quad (10)$$
$$\phantom{=}\frac{g_{01-11}(\overline{\eta}_{11-11}^{1-n-1}\overline{\eta}_{11-11}^n + \overline{\eta}_{11-01}^{1-n-1}\overline{\eta}_{01-11}^n)}{g_{01-01}\overline{\eta}_{11-01}^{1-n-1} + g_{01-11}\overline{\eta}_{11-11}^{1-n-1}}$$

Here, it can be ascertained from Formulas (7) to (10) that an observed ratio is a value including a loss component and an XT component to which the pump light is subjected. Further, it can be ascertained that $L_2$ in Formula (8) and $L_3$ in Formula (9) are values including losses and XT occurring at previous connection points $z_1$ to $z_n$, and are forms in which 2 and 3 have substituted for n in $L_n$ shown in Formula (10).

Subsequently, information on loss and XT is acquired using a ratio of a gain amount observed at each of the connection points $z_1$ to $z_n$ and the Brillouin gain coefficient. Here, since all $L_2$ to $L_n$ can be expressed as $L_n$, a procedure for measuring a loss and XT occurring at the first connection point $z_1$ using $L_1$ and a procedure for measuring a loss and XT occurring at the n-th connection point $z_n$ using $L_n$ will be described below.

(i) Loss and XT at First Connection Point $z_1$

As expressed by Formula (7), $L_1$ is expressed by a loss and XT of $LP_{11}$ and a Brillouin gain coefficient between modes, where characteristics that $L_1$ and the Brillouin gain coefficient depend on the frequency difference ν between a pump light and probe light are utilized. In consideration of the frequency difference, $L_1$ in Formula (7) is expressed as follows.

[Math. 11]

$$L_1(\nu) = \overline{\eta}_{11-11}^1 + \frac{g_{01-01}(\nu)}{g_{01-11}(\nu)}\overline{\eta}_{11-01}^1 = \overline{\eta}_{11-11}^1 + K(\nu)\overline{\eta}_{11-01}^1. \quad (11)$$

Here, K(ν) is a ratio of $g_{01-01}(\nu)$ to $g_{01-11}(\nu)$. A loss and XT occurring at the connection point $z_1$ is expressed as follows by using results obtained at two frequency differences $\nu_1$ and $\nu_2$.

[Math. 12]

$$\overline{\eta}^1_{11-11} = \frac{K(v_1)L_1(v_2) - K(v_2)L_1(v_1)}{K(v_1) - K(v_2)}. \quad (12)$$

$$\overline{\eta}^1_{11-01} = \frac{L_1(v_1) - L_1(v_2)}{K(v_1) - K(v_2)}. \quad (13)$$

Here, since K and $L_1$ can be measured separately, a loss occurring at the connection point $z_1$ can be acquired using Formula (12), and XT can be acquired using Formula (13).

(ii) Loss and XT at n-Th Connection Point $z_n$

Similar to processing of (i), characteristics that $L_n$ and the Brillouin gain coefficient depend on the frequency difference $v$ between the pump light and the probe light are utilized. In consideration of the frequency difference, $L_n$ in Formula (10) can be expressed as follows.

[Math. 14]

$$L_n(v) = \frac{g_{01-01}(v)(\overline{\eta}^{1-n-1}_{11-11}\overline{\eta}^n_{11-01} + \overline{\eta}^{1-n-1}_{11-01}\overline{\eta}^n_{01-01}) +}{g_{01:331:01}(v)\overline{\eta}^{1-n-1}_{11-01} + g_{01-11}(v)\overline{\eta}^{1-n-1}_{11-11}}. \quad (14)$$

Here, given that the denominator of Formula (14) is set to I(v), it can be transformed as follows.

[Math. 15]

$$L_n(v)I(v) = g_{01-01}(v)(\overline{\eta}^{1-n-1}_{11-11}\overline{\eta}^n_{11-01} + \overline{\eta}^{1-n-1}_{11-01}\overline{\eta}^n_{01-01}) + \quad (15)$$

$$g_{01-11}(v)(\overline{\eta}^{1-n-1}_{11-11}\overline{\eta}^n_{11-11} + \overline{\eta}^{1-n-1}_{11-01}\overline{\eta}^n_{01-11}),$$

Using results obtained at four frequency differences $v_1$, $v_2$, $v_3$, and $v_4$, it can be expressed in the following form.

[Math. 16]

$$\begin{bmatrix} L_n(v_1)I(v_1) \\ L_n(v_2)I(v_2) \\ L_n(v_3)I(v_3) \\ L_n(v_4)I(v_4) \end{bmatrix} = \begin{bmatrix} g_{01-01}(v_1)\overline{\eta}^{1-n-1}_{11-01} & g_{01-11}(v_1)\overline{\eta}^{1-n-1}_{11-01} & g_{01-01}(v_1)\overline{\eta}^{1-n-1}_{11-11} & g_{01-11}(v_1)\overline{\eta}^{1-n-1}_{11-11} \\ g_{01-01}(v_2)\overline{\eta}^{1-n-1}_{11-01} & g_{01-11}(v_2)\overline{\eta}^{1-n-1}_{11-01} & g_{01-01}(v_2)\overline{\eta}^{1-n-1}_{11-11} & g_{01-11}(v_2)\overline{\eta}^{1-n-1}_{11-11} \\ g_{01-01}(v_3)\overline{\eta}^{1-n-1}_{11-01} & g_{01-11}(v_3)\overline{\eta}^{1-n-1}_{11-01} & g_{01-01}(v_3)\overline{\eta}^{1-n-1}_{11-11} & g_{01-11}(v_3)\overline{\eta}^{1-n-1}_{11-11} \\ g_{01-01}(v_4)\overline{\eta}^{1-n-1}_{11-01} & g_{01-11}(v_4)\overline{\eta}^{1-n-1}_{11-01} & g_{01-01}(v_4)\overline{\eta}^{1-n-1}_{11-11} & g_{01-11}(v_4)\overline{\eta}^{1-n-1}_{11-11} \end{bmatrix} \begin{bmatrix} \overline{\eta}^n_{01-01} \\ \overline{\eta}^n_{01-11} \\ \overline{\eta}^n_{11-01} \\ \overline{\eta}^n_{11-11} \end{bmatrix}, \quad (16)$$

Here, by multiplying an inverse matrix of a matrix including the Brillouin gain coefficient in Formula (16), Formula (16) can be transformed as follows.

[Math. 17]

$$\begin{bmatrix} \overline{\eta}^n_{01-01} \\ \overline{\eta}^n_{01-11} \\ \overline{\eta}^n_{11-01} \\ \overline{\eta}^n_{11-11} \end{bmatrix} = \begin{bmatrix} g_{01-01}(v_1)\overline{\eta}^{1-n-1}_{11-01} & g_{01-11}(v_1)\overline{\eta}^{1-n-1}_{11-01} & g_{01-01}(v_1)\overline{\eta}^{1-n-1}_{11-11} & g_{01-11}(v_1)\overline{\eta}^{1-n-1}_{11-11} \\ g_{01-01}(v_2)\overline{\eta}^{1-n-1}_{11-01} & g_{01-11}(v_2)\overline{\eta}^{1-n-1}_{11-01} & g_{01-01}(v_2)\overline{\eta}^{1-n-1}_{11-11} & g_{01-11}(v_2)\overline{\eta}^{1-n-1}_{11-11} \\ g_{01-01}(v_3)\overline{\eta}^{1-n-1}_{11-01} & g_{01-11}(v_3)\overline{\eta}^{1-n-1}_{11-01} & g_{01-01}(v_3)\overline{\eta}^{1-n-1}_{11-11} & g_{01-11}(v_3)\overline{\eta}^{1-n-1}_{11-11} \\ g_{01-01}(v_4)\overline{\eta}^{1-n-1}_{11-01} & g_{01-11}(v_4)\overline{\eta}^{1-n-1}_{11-01} & g_{01-01}(v_4)\overline{\eta}^{1-n-1}_{11-11} & g_{01-11}(v_4)\overline{\eta}^{1-n-1}_{11-11} \end{bmatrix}^{-1} \begin{bmatrix} L_n(v_1)I(v_1) \\ L_n(v_2)I(v_2) \\ L_n(v_3)I(v_3) \\ L_n(v_4)I(v_4) \end{bmatrix}. \quad (17)$$

Here, $L_1$ can be measured, and $g_{01-01}$ and $g_{01-11}$ can also be acquired in advance.

Further, since $\eta^{1-n-1}$ can be calculated from measured values of losses and XT at all the connection points from the connection point $z_1$ to the connection point $z_{n-1}$, it can also be acquired with respect to I(v). Therefore, a loss and XT occurring at the connection point $z_n$ can be acquired using Formula (17).

(Measurement Procedure of Present Disclosure)

A loss and XT measurement method of the present disclosure is a method for independently measuring losses and XT occurring at a plurality of points of the optical fiber 100 targeted for measurement, and includes a first step S1 of acquiring a Brillouin gain coefficient, and a second step S2 of calculating a loss and XT at an n-th connection point $z_n$ using the Brillouin gain coefficient in this order.

Figure 6:
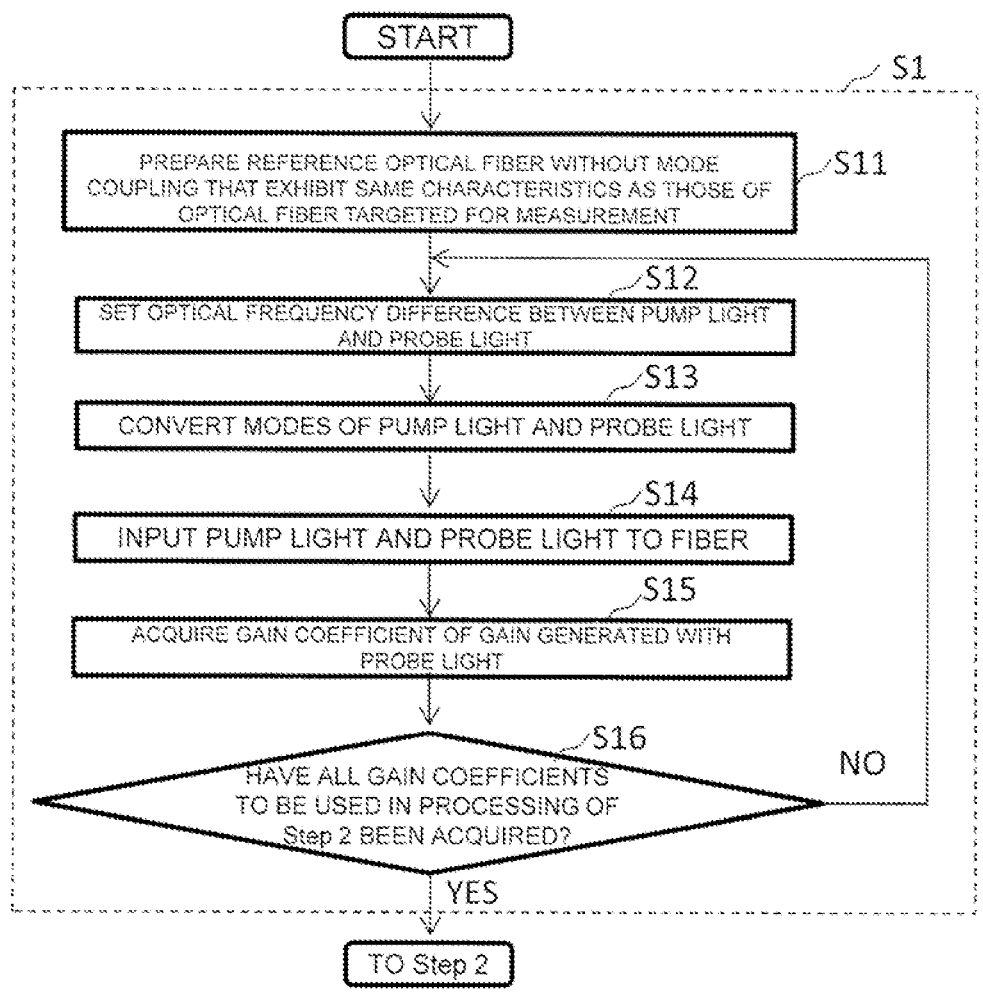
FIG. 6 illustrates an example of a method of acquiring a Brillouin gain coefficient.

FIG. 6 illustrates an example of the first step S1.

A reference optical fiber, without mode coupling, exhibiting the same characteristics as the optical fiber 100 targeted for measurement is prepared (S11). The reference optical fiber has the same number of modes as that of the optical fiber 100 targeted for measurement, and exhibits the same characteristics as those of the optical fiber 100 targeted for measurement.

A frequency difference between a probe light and a pump light is set (S12).

Modes of the probe light and the pump light are converted (S13). For example, the pump light is converted from the $LP_{01}$ mode to the $LP_{11}$ mode. When both the pump light and the probe light are in the $LP_{01}$ mode, this procedure is unnecessary. The pump light and the probe light are input to a reference optical fiber (S14), and a Brillouin gain coefficient of a gain generated by the probe light is acquired (S15).

Whether or not all Brillouin gain coefficients to be used in the second step are acquired is determined (S16): when all Brillouin gain coefficients to be used in the second step are not acquired, steps S12 to S15 are repeated. When all the Brillouin gain coefficients to be used in the second step are acquired, process proceeds to the second step. In the present embodiment, since modes that can propagate in the optical fiber 100 targeted for measurement are the $LP_{01}$ mode and the $LP_{11}$ mode, steps S12 to S15 are repeated until both $g_{01-01}$ and $g_{01-11}$ are acquired.

Figure 7:
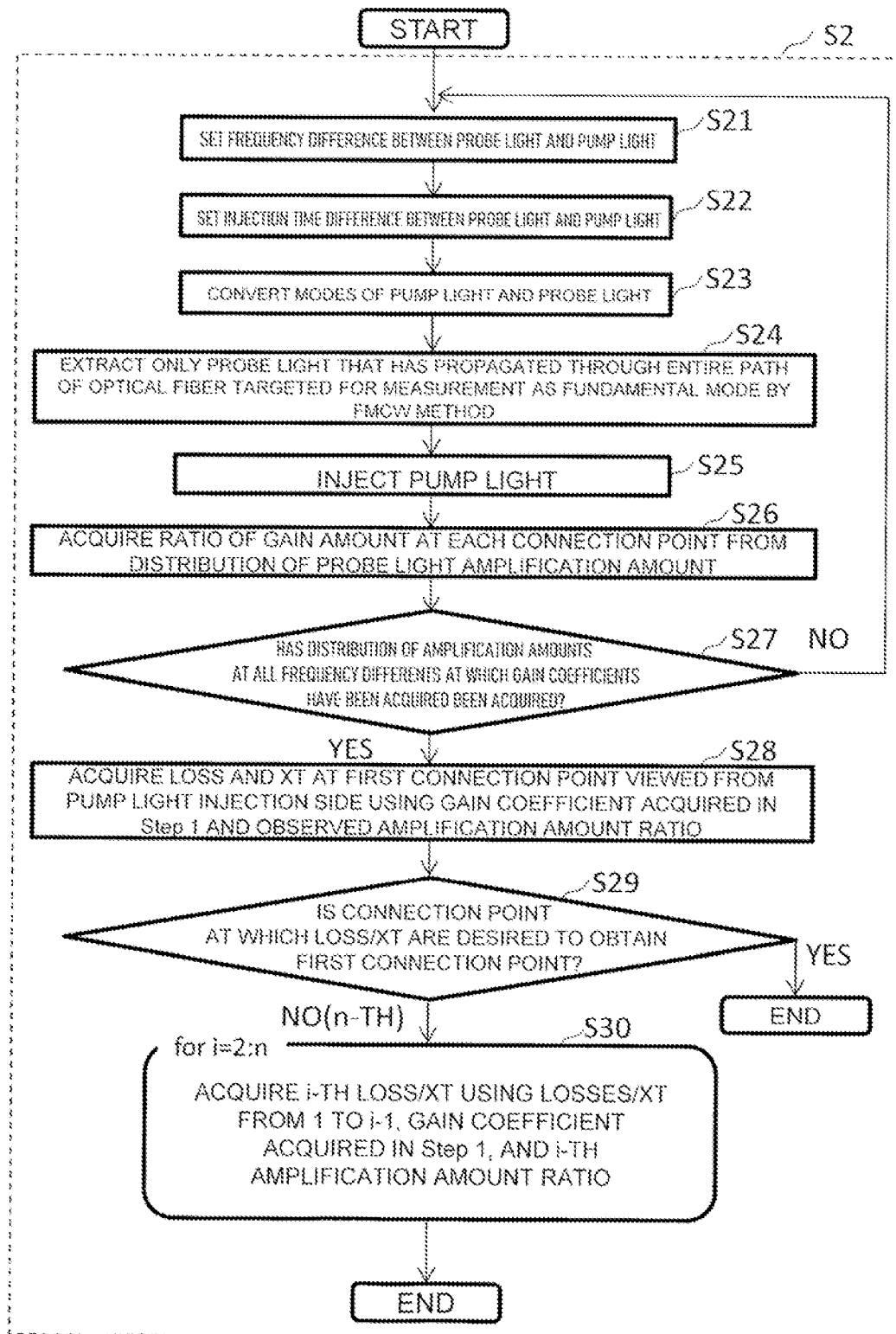
FIG. 7 illustrates an example of a method of acquiring a Brillouin gain coefficient.

FIG. 7 illustrates an example of the second step S2.

S21: A frequency difference between the probe light and the pump light is set. At this time, a frequency difference between the probe light and the pump light, where one arbitrary Brillouin gain coefficient has been acquired, is set. For example, a frequency difference of 10.795 GHz, at which the peak of the Brillouin gain coefficient $g_{01-11}$ of the $LP_{11}$ mode and the $LP_{01}$ mode shown in FIG. 2 is obtained, is set. Here, at least two gain coefficients are required in the present disclosure. Accordingly, two or more frequency differences are set.

S22: An injection time difference between the probe light and the pump light is set. Here, since the injection time difference between the probe light and the pump light corresponds to a point where the probe light and the pump light collide in the optical fiber, the injection time difference is set such that gain amounts before and after the connection point can be acquired.

S23: Modes of the pump light and the probe light are converted. For example, the pump light is converted from the $LP_{01}$ mode to the $LP_{11}$ mode. When both the pump light and the probe light are in the $LP_{01}$ mode, this procedure is unnecessary.

S24: Only the probe light that has propagated as the fundamental mode through the entire path of the optical fiber 100 targeted for measurement is extracted through the FMCW method. A specific method is as described with reference to FIG. 4.

S25: The pump light is injected.

S26: A ratio of a gain amount at each of connection points $z_1$ to $z_n$ is acquired from a distribution of amplification amounts of the probe light when the pump light has been injected.

S27: It is determined whether or not a distribution of amplification amounts at all the frequency differences, at which gain coefficients have been acquired, has been acquired. When the distribution of amplification amounts at all the frequency differences, at which the gain coefficients have been acquired, has not been acquired (No in S27), steps S21 to S26 are repeated. When the distribution of amplification amounts at all the frequency differences, at which the gain coefficients have been acquired, has been acquired (Yes in S27), the following processing is executed.

S28: A loss and XT at the first connection point viewed from the pump light injection side are acquired using the Brillouin gain coefficients acquired in the first step S1 and observed amplification amount ratios.

S29: It is determined whether or not a connection point where a loss and XT are desired to be obtained is the first connection point.

S30: An i-th loss and XT are acquired using the losses and XT from 1 to i−1, the Brillouin gain coefficients acquired in step S1, and an i-th amplification amount ratio.

Note that an example of the optical fiber targeted for measurement being a TMF in which only two modes propagate is illustrated in the present embodiment, but the present disclosure is not limited thereto. For example, the present disclosure can also be applied to an optical fiber targeted for measurement that propagates in three or more modes by setting propagation modes of a probe light and a pump light to three or more modes and setting frequency differences set in step S21 to three or more.

INDUSTRIAL APPLICABILITY

The present disclosure is applicable to information and communication industries.

REFERENCE SIGNS LIST

11 Frequency sweep light source
12, 17 Branching element
13 Multiplexing element
14 Light receiving means
15 Numerical processing means
16 Numerical calculation means
21 Mode multiplexing/demultiplexing means
22 Delay optical fiber
31 Optical frequency control means
32 Optical pulse forming means
100 Optical fiber targeted for measurement
101 TMF

The invention claimed is:

1. An apparatus for measuring a loss and crosstalk of an optical fiber targeted for measurement, the apparatus comprising:
a light injecting unit configured to inject a frequency-swept probe light into one end of the optical fiber targeted for measurement and inject a pump light having a frequency difference corresponding to a Brillouin frequency shift amount, with respect to the probe light, into the other end of the optical fiber targeted for measurement, and thereby amplify the probe light in the optical fiber targeted for measurement;
a light receiving unit configured to receive a multiplexed light obtained by multiplexing a local light, given a delay time by injection into a delay optical fiber having a length corresponding to a group delay time in propagation through an entire path of the optical fiber targeted for measurement as a fundamental mode, with the probe light output from the optical fiber targeted for measurement;
an interference waveform measurement unit configured to measure an interference waveform between the probe light and the local light using a signal intensity obtained from the light receiving unit;
a fundamental mode time waveform analysis unit configured to acquire a fundamental mode time waveform of a probe light that has propagated through the entire path of the optical fiber targeted for measurement as a fundamental mode, based on the interference waveform; and
a control calculation unit configured to calculate a loss and crosstalk at a desired point of the optical fiber targeted for measurement, based on the fundamental mode time waveform.

2. The apparatus according to claim 1, wherein the control calculation unit executes:
acquiring Brillouin gain coefficients of the optical fiber targeted for measurement with respect to all combinations of the pump light and the probe light in possible propagation modes through the optical fiber targeted for measurement;
acquiring Brillouin amplification components, generated by the probe light, as a distribution in a longitudinal direction of the optical fiber targeted for measurement using the fundamental mode time waveform;
acquiring a ratio of an amplification amount depending on Brillouin amplification at a loss and crosstalk occurrence point using the distribution of the Brillouin amplification components in the longitudinal direction of the optical fiber targeted for measurement; and
calculating a loss and crosstalk at an arbitrary point of the optical fiber targeted for measurement using a ratio of the amplification amount from an injection point of the pump light to the desired point and the Brillouin gain coefficients.

3. The apparatus according to claim 2, wherein the control calculation unit executes: instructing the light injecting unit to inject a pump light having an arbitrary frequency difference with respect to a probe light and the probe light into a reference optical fiber, having the same possible propagation modes as those of the optical fiber targeted for measurement and having no mode coupling, in combination with a probe light in one arbitrary mode that is able to propagate through the optical fiber targeted for measurement;

acquiring a Brillouin gain coefficient of the optical fiber targeted for measurement from the signal intensity measured by the light receiving unit for each combination of possible propagation modes of the optical fiber targeted for measurement;

instructing the light injecting unit to change the arbitrary frequency difference and inject into the reference optical fiber, in combination with the probe light in one arbitrary mode that is able to propagate through the optical fiber targeted for measurement;

acquiring the Brillouin gain coefficient with the arbitrary frequency difference changed, from the signal intensity measured by the light receiving unit; and calculating a loss and crosstalk at a desired point of the optical fiber targeted for measurement, based on a Brillouin gain coefficients of the optical fiber, targeted for measurement, corresponding to the frequency difference and on the fundamental mode time waveform.

4. The apparatus according to claim 2, wherein the control calculation unit executes:

calculating a loss and crosstalk at a first loss and crosstalk occurrence point from the injection point of the pump light using the ratio of the amplification amount at the first loss and crosstalk occurrence point from the injection point of the pump light and the Brillouin gain coefficient, and calculating a loss and crosstalk at the desired point using losses and crosstalk from the injection point of the pump light to the desired point, the ratio of the amplification amount at the desired point, and the Brillouin gain coefficient.

5. The apparatus according to claim 1, wherein the fundamental mode time wavelength analysis unit is configured to:

acquire a probe light intensity of a beat frequency of a probe light and a local light by performing a Fourier transform on the interference waveform measured by the interference waveform measurement unit;

extract a frequency component of a minimum peak of peaks of the probe light intensity of the beat frequency; and acquire the fundamental mode time waveform by performing an inverse Fourier transform on the extracted frequency component.

6. A method of measuring a loss and crosstalk of an optical fiber targeted for measurement, the method comprising:

injecting, by a light injecting unit, a frequency-swept probe light into one end of the optical fiber targeted for measurement and a pump light having a frequency difference corresponding to a Brillouin frequency shift amount, with respect to the probe light, into the other end of the optical fiber targeted for measurement, and thereby amplifying the probe light in the optical fiber targeted for measurement;

receiving, by a light receiving unit, a multiplexed light obtained by multiplexing a local light, given a delay time by injection into a delay optical fiber having a length corresponding to a group delay time in propagation through an entire path of the optical fiber targeted for measurement as a fundamental mode, with the probe light output from the optical fiber targeted for measurement;

measuring, by an interference waveform measurement unit, an interference waveform between the probe light and the local light using a signal intensity obtained from the light receiving unit;

acquiring, by a fundamental mode time waveform analysis unit, a fundamental mode time waveform of a probe light that has propagated through the entire path of the optical fiber targeted for measurement as a fundamental mode, based on the interference waveform; and calculating, by a control calculation unit, a loss and crosstalk at a desired point of the optical fiber targeted for measurement, based on the fundamental mode time waveform.

\* \* \* \* \*